(12) United States Patent
Morrish et al.

(10) Patent No.: US 10,948,101 B2
(45) Date of Patent: Mar. 16, 2021

(54) NOISE-RESPONSIVE CONTROL OF A SENSING SYSTEM

(71) Applicant: Masco Canada Limited, St. Thomas (CA)

(72) Inventors: David Paul Morrish, Glencoe (CA); Bryan Fisher, Appin (CA)

(73) Assignee: MASCO CANADA LIMITED, St. Thomas (CA)

( * ) Notice: Subject to any disclaimer, the term of this patent is extended or adjusted under 35 U.S.C. 154(b) by 427 days.

(21) Appl. No.: 15/791,785

(22) Filed: Oct. 24, 2017

(65) Prior Publication Data

US 2018/0119842 A1    May 3, 2018

Related U.S. Application Data

(60) Provisional application No. 62/415,152, filed on Oct. 31, 2016.

(51) Int. Cl.

| | |
|---|---|
| *F16K 31/06* | (2006.01) |
| *H01F 7/18* | (2006.01) |
| *E03C 1/05* | (2006.01) |
| *E03C 1/04* | (2006.01) |
| *F16K 11/00* | (2006.01) |

(52) U.S. Cl.
CPC ........ *F16K 31/0675* (2013.01); *E03C 1/0404* (2013.01); *E03C 1/05* (2013.01); *F16K 19/006* (2013.01); *H01F 7/1844* (2013.01); *H01F 2007/1866* (2013.01); *H01F 2007/1888* (2013.01)

(58) Field of Classification Search
CPC .. F16K 31/0675; F16K 19/006; E03C 1/0404; E03C 1/05; H01F 7/1844; H01F 2007/1866; H01F 2007/1888
See application file for complete search history.

(56) References Cited

U.S. PATENT DOCUMENTS

| | | |
|---|---|---|
| 5,566,702 A | 10/1996 | Philipp |
| 5,918,855 A | 7/1999 | Hamanaka et al. |
| 5,986,600 A | 11/1999 | McEwan |
| 6,206,340 B1 | 3/2001 | Paese et al. |
| 6,250,601 B1 | 6/2001 | Kolar et al. |

(Continued)

OTHER PUBLICATIONS

Smith, The Scientist and Engineer's Guide to Digital Signal Processing 1997 California Technical Publishing (Year: 1997).*

(Continued)

*Primary Examiner* — Regis J Betsch
(74) *Attorney, Agent, or Firm* — Reising Ethington P.C.

(57) ABSTRACT

A fluid dispensing device and method for controlling the device are provided. The device includes a housing defining a fluid outlet. A valve controls the flow of fluid to the outlet. A sensor is configured to detect an object outside of and proximate to the housing. A solenoid is configured to move the valve between an open position and a closed position. A controller is configured to receive the output signal of the sensor, determine a characteristic of noise in the output signal such as a level of noise; adjust at least one of a sampling rate of the output signal and an amount of filtering of the output signal responsive to the characteristic of noise in the output signal, and transmit a control signal to the solenoid responsive to the output signal.

25 Claims, 5 Drawing Sheets

(56) References Cited

U.S. PATENT DOCUMENTS

| | | | |
|---|---|---|---|
| 6,338,358 B1 | 1/2002 | Watanabe et al. |
| 6,619,320 B2 | 9/2003 | Parsons |
| 6,731,209 B2 | 5/2004 | Wadlow et al. |
| 6,850,229 B2 | 2/2005 | Casebolt et al. |
| 6,948,194 B2 | 9/2005 | Todoroki et al. |
| 6,954,867 B2 | 10/2005 | Casebolt et al. |
| 6,995,747 B2 | 2/2006 | Casebolt et al. |
| 7,069,941 B2 | 7/2006 | Parsons et al. |
| 7,174,577 B2 | 2/2007 | Jost et al. |
| 7,199,783 B2 | 4/2007 | Wenstrand et al. |
| 7,278,624 B2 | 10/2007 | Iott et al. |
| 7,378,954 B2 | 5/2008 | Wendt |
| 7,537,195 B2 | 5/2009 | McDaniel et al. |
| 7,614,096 B2 | 10/2009 | Vincent |
| 7,690,623 B2 | 4/2010 | Parsons et al. |
| RE42,005 E | 12/2010 | Jost et al. |
| 7,952,233 B2 | 5/2011 | Bayley et al. |
| 8,104,113 B2 | 1/2012 | Rodenbeck et al. |
| 8,376,313 B2 | 2/2013 | Burke et al. |
| 8,381,329 B2 | 2/2013 | Bayley et al. |
| 8,482,409 B2 | 7/2013 | Sawaski |
| 8,496,025 B2 | 7/2013 | Parsons et al. |
| 8,502,681 B2 | 8/2013 | Bolling et al. |
| 8,922,369 B2 | 12/2014 | Sawaski |
| 8,984,679 B2 | 3/2015 | Bayley et al. |
| 9,032,565 B2 | 5/2015 | Loeck et al. |
| 9,284,724 B2 | 3/2016 | Yang |
| 9,328,490 B2 | 5/2016 | Bayley et al. |
| 9,329,721 B1 * | 5/2016 | Buuck ............... G06F 3/0418 |
| 2003/0102037 A1 * | 6/2003 | Parsons ............... E03C 1/05 137/624.11 |
| 2014/0174556 A1 | 6/2014 | Herbert et al. |
| 2014/0246099 A1 | 9/2014 | Herbert et al. |

OTHER PUBLICATIONS

Jania, "Efficient Tuning of Capacitive Sensing Designs", DighiKey Article Library 2011 (Year: 2011).*

* cited by examiner

NOISE-RESPONSIVE CONTROL OF A SENSING SYSTEM

BACKGROUND a. Field

This disclosure relates generally to fluid dispensing devices used to control the flow of fluid and methods for controlling such devices. More specifically, this disclosure pertains to automated fluid dispensing devices in which variation in noise levels in a signal from a proximity or similar sensor is detected and used to identify the source of the noise and the resulting actions taken to improve sensor reliability.

b. Background Art

Automated faucets (also referred to as hands-free or touchless faucets) and other fluid dispensing devices employ a sensor to identify whether or not a person or other object is present. The sensor generates a signal that is used by a control circuit to turn the faucet on or off. The signal, however, is subject to induced noise from electromagnetic fields generated by electrical devices in the surrounding environment. The noise may be transmitted to the sensor by conductive emissions from, for example, alternating current power connections, batteries, or ground connections and by radiated emissions from nearby conductive objects (e.g., a sink, hoses, or a drain). It is possible to reduce the level of noise in a signal by filtering the signal. Different devices in the surrounding environment for a faucet may generate different levels of signal noise, however, and applying a filter that is sufficient to reduce noise in environments with a low signal to noise ratio will consume significant power even in environments with a high signal to noise ratio.

The inventors herein have recognized a need for a faucet that will overcome one or more of the above-identified deficiencies.

BRIEF SUMMARY

A fluid dispensing device for controlling the flow of fluids and a method for controlling a fluid dispensing device are provided. In particular, a fluid dispensing device and method are provided that determine the level of noise in a signal from a proximity or similar sensor associated with the device and, in response, determines the type of actions taken to improve sensor reliability.

A fluid dispensing device in accordance with one embodiment includes a housing defining a fluid outlet. A valve controls the flow of fluid to the fluid outlet. The device further includes a sensor configured to detect an object outside of and proximate to the housing. The device further includes a solenoid configured to move the valve between an open position and a closed position. The device further includes a controller. The controller is configured to receive the output signal of the sensor and to perform a process for addressing noise in the output signal. The process includes determining a characteristic of noise in the output signal and adjusting at least one of a sampling rate of the output signal and an amount of filtering of the output signal responsive to the characteristic of noise in the output signal. The controller is further configured to transmit a control signal to the solenoid responsive to the output signal.

A fluid dispensing device in accordance with another embodiment includes a housing defining a fluid outlet. A valve controls the flow of fluid to the fluid outlet. The device further includes a sensor configured to detect an object outside of and proximate to the housing. The device further includes a solenoid configured to move the valve between an open position and a closed position. The device further includes a sensor subcontroller. The sensor subcontroller is configured to receive the output signal of the sensor and determine a characteristic of noise in the output signal. The sensor subcontroller is further configured to adjust at least one of a sampling rate of the output signal and an amount of filtering of the output signal responsive to the characteristic of noise in the output signal. The device further includes a solenoid subcontroller configured to transmit a control signal to the solenoid responsive to the output signal.

A method for controlling a fluid dispensing device in accordance with one embodiment includes the step of receiving an output signal of a sensor configured to detect an object outside of and proximate to a housing of the fluid dispensing device. The method further includes the steps of determining a characteristic of noise in the output signal and adjusting at least one of a sampling rate of the output signal and an amount of filtering of the output signal responsive to the characteristic of noise in the output signal. The method further includes the step of transmitting, responsive to the output signal, a control signal to a solenoid configured to move a valve between an open position and a closed position to control the flow of fluid to a fluid outlet defined in the housing.

The foregoing and other aspects, features, details, utilities, and advantages of the disclosed embodiments will be apparent from reading the following description and claims, and from reviewing the accompanying drawings.

DETAILED DESCRIPTION

Figure 1:
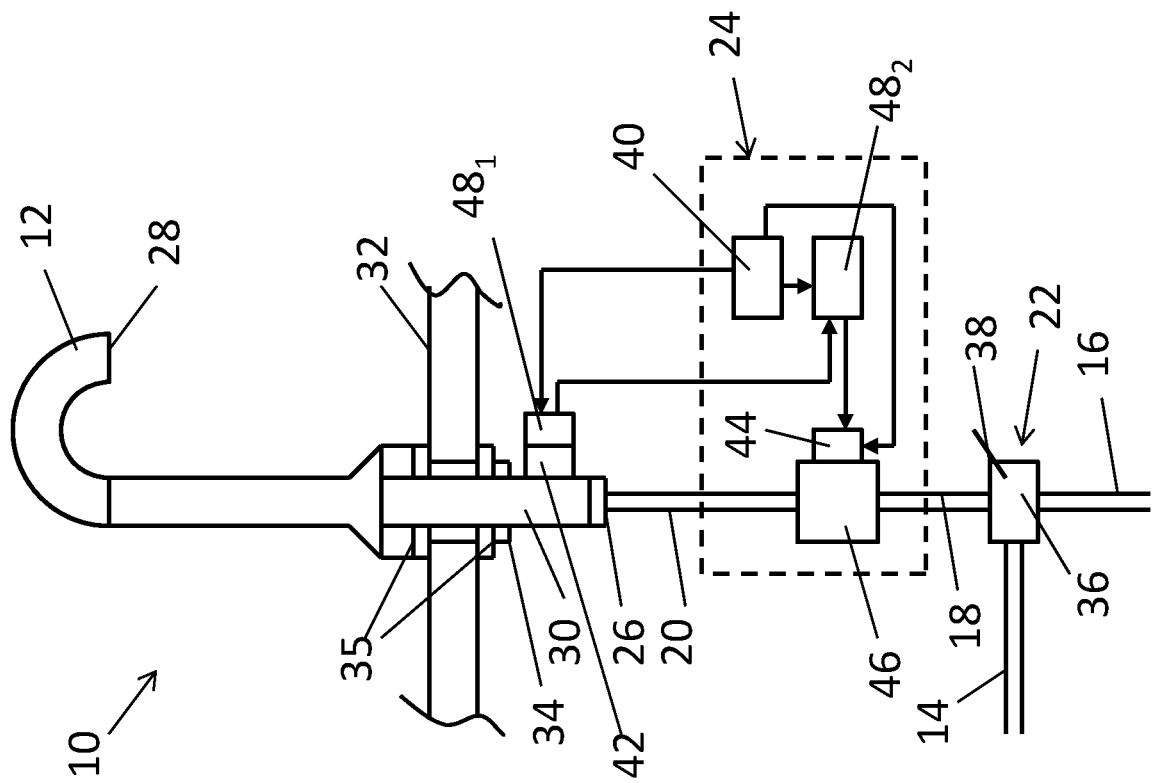
FIG. 1 is a diagrammatic view of one embodiment of a fluid dispensing device.

Referring now to the drawings wherein like reference numerals are used to identify identical components in the various views, FIG. 1 illustrates one embodiment of a fluid dispensing device 10 for use in controlling the flow of fluid from a fluid source. In the illustrated embodiment, device 10 comprises a faucet that is used to control the flow of water from municipal or home water lines and is adapted for use in a kitchen or bathroom sink. It should be understood, however, that the teachings herein could be implemented in a variety of devices including those used in showers and bath tubs and on toilets. Device 10 may include a housing 12, fluid conduits 14, 16, 18, 20, a mixer 22 and a fluid control system 24.

Housing 12 is provided to direct fluids to a precise location and to provide an aesthetically pleasing appearance to a user. In the illustrated embodiment, mixer 22 and actuator 24 are disposed outside of housing 12. It should be understood, however, that one or more of mixer 22 and system 24 (or components thereof) could alternatively be disposed within housing 12 in which case housing 12 would also provide protection for these components from foreign objects and elements and position and orient the components relative to one another. The exterior of housing 12 may assume a variety of forms determined by both functional and aesthetic configurations. In the illustrated embodiment, housing 12 defines an inlet 26 configured to receive fluid from conduit 20. Inlet 26 may be formed at one end of housing 12 and may include features formed therein for retaining conduit 20 or for supporting coupling elements used to retain conduit 20. Housing 12 may also define an outlet 28 at an opposite end of housing 12 through which fluid exits device 10 for use by a user of device 10. Housing 12 may consist of a single, unitary member or multiple members joined to one another in a variety of ways to form a fluid tight seals including through use of adhesives, welds, or fasteners with a seal formed around between or around the intersection of the members. A mounting stud 30 may be provided to secure device 10 to surrounding structure and may extend from housing 12. The stud 30 may, for example, be threaded and may be inserted in an aperture on one side of a deck/counter 32 surrounding a sink and secured using a nut 34 placed over the stud 30 and rotated until the nut 34 abuts the underside of the deck/counter 32. Isolators 35 made from electrically insulative materials may be disposed above and below deck/counter 32 to isolate housing 12 and stud 30 from deck/counter 32 and ground.

Fluid conduits 14, 16 are provided for delivering hot and cold fluids to mixer 22. It should be understood that "hot" and "cold" as used herein refer to a difference in relative temperature among the fluids delivered by conduits 14, 16 as opposed to any specific temperature values for those fluids. In particular, the fluid conveyed by hot fluid conduit 14 will have a higher temperature than the fluid conveyed by cold fluid conduit 16 and will typically be heated by a conventional water heater or similar device. Conduits 18, 20 are provided to deliver fluid from mixer 22 to inlet 26 of housing 12. Conduits 14, 16, 18, 20 may be made from conventional metals and/or plastics and typically comprise a multi-layer wall having metallic and/or thermoplastic layers configured to achieve a variety of desirable characteristics including, for example, fluid sealing, temperature resistance and flexibility. Conduits 14, 16, 18, 20 may be joined to housing 12, mixer 22 and/or other components of device 10 using conventional coupling mechanisms.

Mixer 22 is provided control the ratio of hot and cold fluids that are ultimately delivered to outlet 28. Mixer 22 is configured to receive a first fluid from hot fluid conduit 14 and a second fluid from cold fluid conduit 16 and to output either the first fluid, the second fluid or a mixture of the first and second fluids to conduit 18. Mixer 22 includes a valve 36 and an actuator 38 configured to allow a user to adjust the position of valve 36 and thereby control the amount of fluids from each of hot and cold fluid conduits 14, 16 that are output by mixer 22. The actuator 38 may comprise a handle that is connected to the valve 36 by a fastener and configured to rotate about an axis. Rotation of the handle adjusts the position of the valve 36. The actuator 38 is capable of moving the valve 36 to any of a plurality of positions with each position establishing a different ratio of the amount of fluid from the hot fluid conduit 14 relative to the amount of fluid from the cold fluid conduit 16 that is output by the mixer 22 to conduit 18. Although mixer 22 is located below deck 32 and separate from housing 12 in the illustrated embodiment, it should be understood that mixer 22 could be disposed within housing 12 and may be located above or below deck 32 in various embodiments.

System 24 is provided to turn the device on or off in the presence of a user. System 24 may include a power source 40, a sensor 42, a solenoid 44, a valve 46, and a controller 48 (which is subdivided in the illustrated embodiment into subcontrollers $48_1$ and $48_2$). Again, although system 24 is located below deck 32 and separate from housing 12 in the illustrated embodiment, it should be understood that one or more components of system 24 could be disposed within housing 12 and may be located above or below deck 32 in various embodiments.

Power source 40 provides current to electronic components such as sensor 42, solenoid 44 and controller 48. Power source 40 may comprise a battery or a capacitor and may be connected to external devices used for energy harvesting. Power source 40 may also comprise an interface to the electrical grid such as a building electrical outlet. In accordance with one aspect of the present disclosure, controller 48 may be configured to identify the type of power source used based on a characteristic (e.g. a level) of noise in signals measured by sensor 42.

Sensor 42 detects the presence of an object (e.g., a person) within a defined area outside of and proximate to housing 12. In the illustrated embodiment, sensor 42 is disposed below counter/deck 32 and may comprise a proximity/capacitance sensor that is in contact with stud 30 to form a capacitance circuit with housing 12 and stud 30. In other embodiments, sensor 42 may be disposed within housing 12. In other embodiments, sensor 42 may comprise a voltage sensor. The signal output by sensor 42 is subject to varying levels of interference or induced noise resulting from electromagnetic fields generated in the environment surrounding device 10 by, e.g., power source 40, other electronic devices, and conductors (e.g. sinks, hoses or drains).

Solenoid 44 is provided to control the position of valve 46. In the presence of an object, sensor 42 generates a signal and provides that signal to controller 48. In response, controller 48 outputs a signal that causes solenoid 44 to open valve 46 and allow fluid flow through valve 46 from conduit 18 to conduit 20 (and ultimately to outlet 28 in housing 12). When the object moves a sufficient distance away from sensor 42, a signal from sensor 42 is sent and, in response, controller 48 directs solenoid 44 to close valve 46 and prevent further fluid flow through valve 46. It should be understood that variations in the control method disclosed herein are possible including methods in which controller 48 directs solenoid 44 to maintain valve 46 in an open position for a predetermined period of time before closing valve 46.

Valve 46 controls the flow of fluid from mixer 22 towards outlet 28. Valve 46 is capable of assuming an open position wherein fluid flows from mixer 22 towards outlet 28 and a closed position blocking fluid flow from mixer 22 to outlet 28. Valve 46 is moved between the open and closed positions responsive to the movement of solenoid 44.

Controller 48 is configured to control solenoid 44 responsive to the signal generated by sensor 42. In the illustrated embodiment, the functionality of controller 48 is subdivided into a sensor subcontroller $48_1$ and a solenoid subcontroller $48_2$. Therefore, it should be understood that the term controller as used herein encompasses situations where the functionality of controller 48 as described hereinbelow is combined in a single controller or is divided among multiple sub-controllers configured for communication with one another. In the embodiment illustrated in FIG. 1, for example, sensor subcontroller $48_1$ is integrated with sensor 42 and configured to process the signal generated by sensor 42 including varying the sampling rate of the signal and/or filtering the signal as described hereinbelow while another subcontroller $48_2$ is configured to receive the processed signal and generate control signals for solenoid 44 in response. Controller 48 may comprise a programmable microprocessor or an application specific integrated circuit (ASIC). Controller 48 may include a central processing unit (CPU) and an input/output (I/O) interface through which controller 48 may receive of input signals including signals generated by sensor 42 and generate output signals including those used to control solenoid 44. The I/O interface may further include a user interface through which an installer can input information and commands to controller 48 and/or receive information from controller 48. In some embodiments, the user interface may comprise a display such as a liquid crystal or light emitting diode segment display or video display and pushbuttons or other input devices that permit a user to enter information or commands (e.g., by selecting from a menu on the display) and control the display of information output through the user interface. It should be understood, however, that a variety of user interfaces may be employed including touchscreen displays.

Figure 2A:
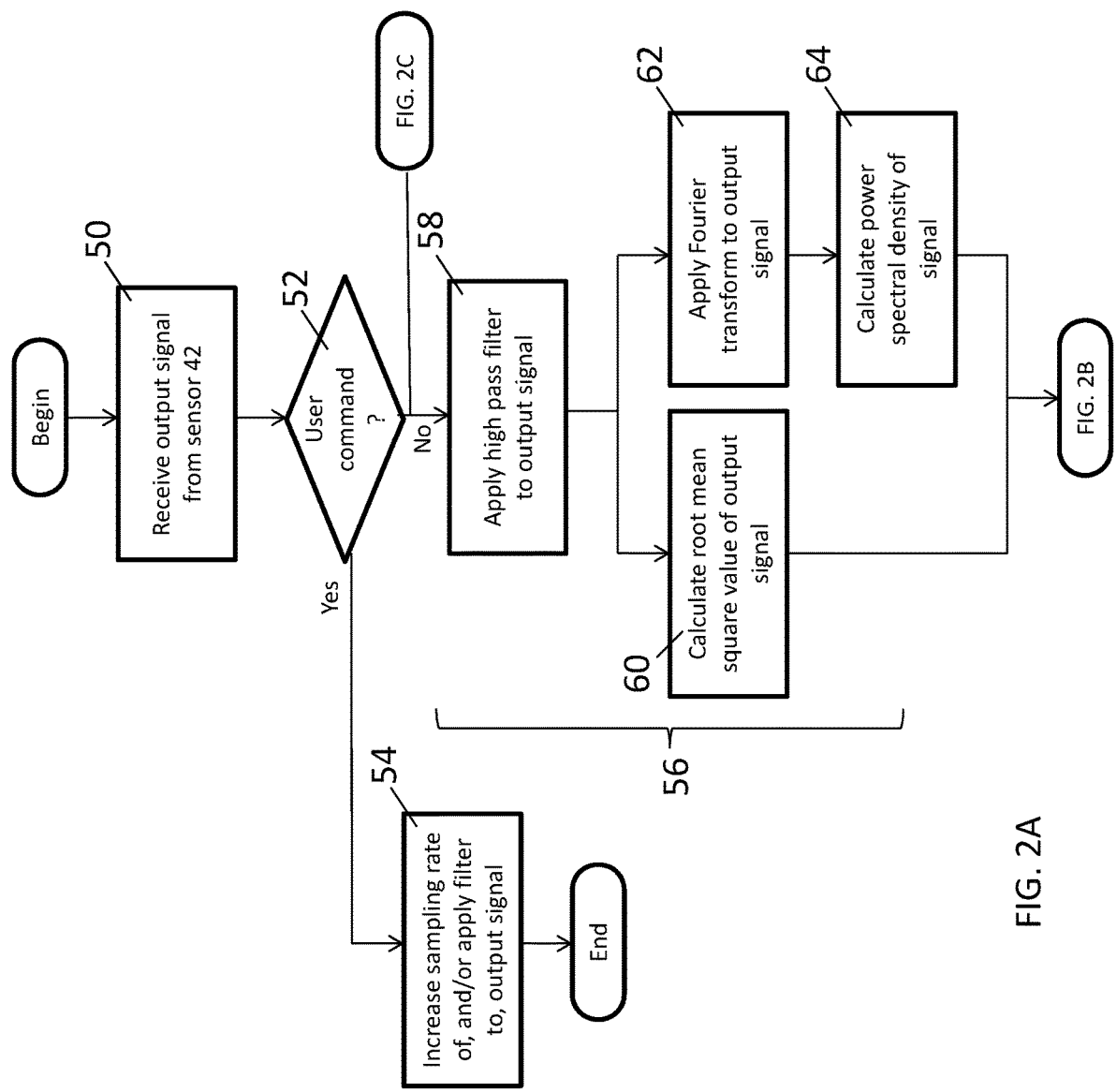
FIGS. 2A-2D are flowcharts illustrating embodiments of a method for controlling a fluid dispensing device.

Controller 48 may be configured (encoded) with programming instructions from a computer program (i.e. software) to perform a method for controlling device 10. The method may be performed when power is first applied to device 10 upon start-up of the device 10 following installation and/or periodically after start up. Referring now to FIG. 2A, the method may begin with the step 50 of receiving an output signal of sensor 42. As noted above, sensor 42 is configured to detect a person or another object outside of and proximate to housing 12 of device 10 and to generate an output signal in response. Controller 48 may increase or decrease the sampling rate for the signal from sensor 42 at start up and/or periodically after start up to measure the noise level and decide on the logic to apply.

In some circumstances, it may be desirable to allow a user, such as an installer, to request actions intended to address noise in the output signal from sensor 42 regardless of the actual characteristics of the signal and the surrounding environment. For example, an installer may want to test how the sensor 42 will act under certain conditions. Alternatively, the installer may know that the sensor 42 will be drawing power from a particular power source (e.g., an alternating current source) that will generate a certain level of noise in the output signal from sensor 42. In some embodiments, therefore, controller 48 may be configured to receive a command from the installer through the I/O interface and to take certain actions with respect to the output signal in response to the command that are intended to reduce noise in the output signal. In one embodiment, controller 48 may perform the steps 52, 54 of determining whether a user command to take an action to address noise has been received through the I/O interface of controller 48 and, if so, to perform the commanded action such as by increasing at least one a sampling rate for the output signal and an amount of filtering of the output signal.

In the absence of a user command, controller 48 may be configured to perform several steps in a process for addressing noise in the output signal. The process may begin with the step 56 of determining a characteristic of noise in the output signal such as a level of noise in the output signal. By determining characteristics of noise in the output signal, controller 48 is capable of identifying the source of the noise and/or applying appropriate measures to reduce the noise. Step 56 may include several substeps. In substep 58, controller 48 (or subcontroller 48₁ in the illustrated embodiment) may be configured to apply a high pass filter to the output signal. In one embodiment, the high pass filter may be implemented by applying a low pass filter to the output signal to identify and extract the low frequency components of the signal and then subtracting those components from the output signal. The high pass filter is intended to attenuate those portions of the signal that may be impacted by nearby personnel such as an installer of the device 10 so that the presence of an individual is not interpreted as fixed site noise that would otherwise impact the identification of the source of noise and subsequent actions to address the source of the noise. In accordance with one embodiment, step 56 may further include the substep 60 of calculating a root mean square value of the remaining portions of the output signal. In accordance with another embodiment, step 56 may alternatively include the substeps 62, 64 of applying a transform (e.g., a Fourier transform) to the remaining portions of the output signal to obtain a frequency domain signal and perform a numerical analysis of the frequency domain signal. For example, in one embodiment, the method may include calculating a power spectral density of the frequency domain signal. Although exemplary embodiments are shown in substeps 60 and 62, 64 it should be understood that other values indicative of characteristics of noise in the output signal could alternatively be calculated in either the time or frequency domains. The values obtained in substeps 60, 64 may be compared against empirically derived values to identify the source of the noise. In particular, certain sources of induced noise will generate more noise than others. If the power source 40 for device 10 comprises an alternating current power source such as a connection to an electrical grid, the level of noise in the signal may be relatively high. If the power source 40 comprises a battery, the level of noise in the signal may be relatively low. Therefore, in devices that can draw on multiple power sources (e.g., where the primary power source is an alternating current source with a battery for backup) or in devices that may be used with a variety of power sources, the comparison can be used to identify the power source 40 that is being used so that appropriate noise reduction measures are taken based on the likely level of induced noise going forward.

Figure 2B:
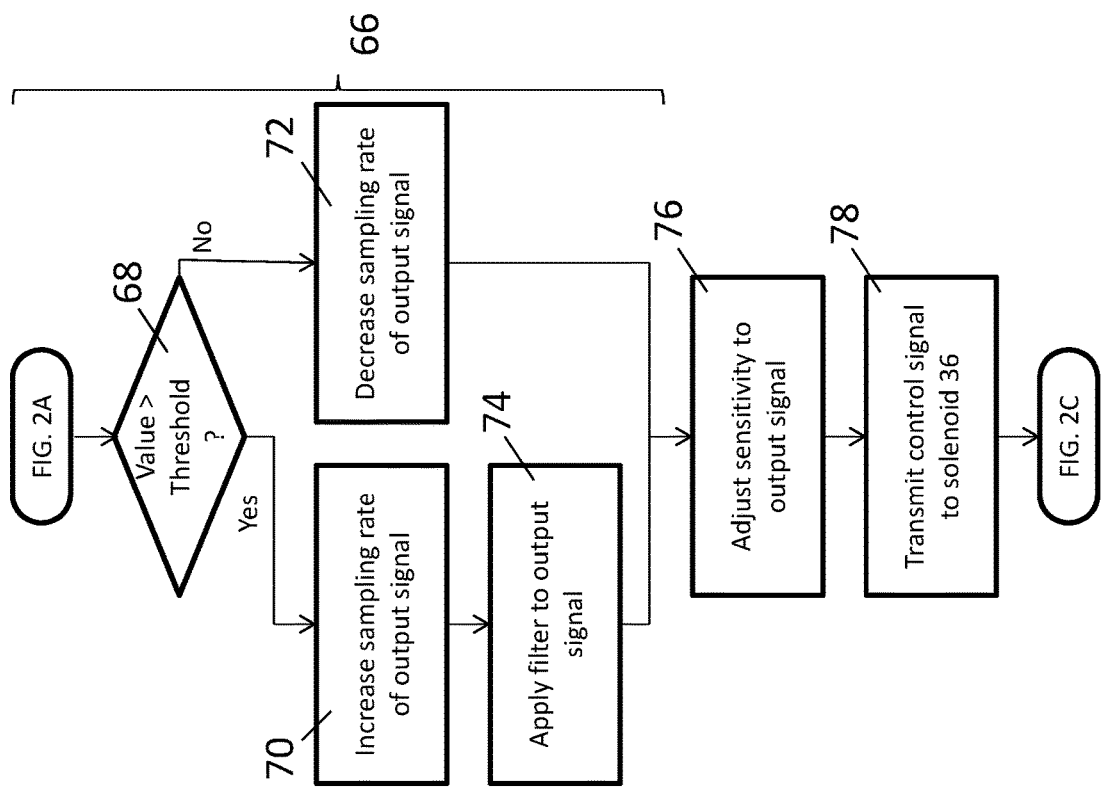

Referring now to FIG. 2B, the method may continue with one or more steps intended to mitigate or reduce the level of noise in the signal in order to insure greater reliability in the output signal generated by sensor 42. In accordance with one embodiment, the method may include the step 66 of adjusting at least one of a sampling rate of the output signal from sensor 42 and an amount of filtering of the output signal responsive to the characteristic of noise in the output signal. Step 66 may include several substeps. In substep 68, controller 48 is configured to compare a level of noise in the output signal to a predetermined threshold level. As noted above, root mean square or power spectral density values for varying levels of induced noise in the signal caused by conducted and radiated emissions from various devices can be empirically determined. From these values, one or more threshold values can be identified indicative of certain levels of noise at which it is desired to perform some action. Depending on the results of the comparison between the noise level indicated by the measured root mean square value or power spectral density value obtained in step 56 and the predetermined threshold level, various actions can be taken. In one embodiment, controller 48 is configured to perform one of the substeps 70 or 72 of increasing, or decreasing, the sampling rate of the output signal if the level of noise in the output signal meets a predetermined condition relative to the predetermined threshold noise level. For example, if the comparison in substep 68 indicates that the level of noise exceeds a predetermined threshold level, controller 48 (or subcontroller 48₁ in the illustrated embodiment) may increase the sampling rate of the output signal to decrease the user detection response time—the time between when an object is presented near device 10 and water begins to flow out of outlet 28—and also increase the reliability of the information provided by the signal. Doing so will increase the use of computational resources and power consumption from power source 40, but will reduce or prevent false readings based on noise in the output signal. If the comparison in substep 68 indicates that the level of noise does not exceed the predetermined threshold level, controller 48 (or subcontroller 48$_1$ in the illustrated embodiment) may decrease the sampling rate of the output signal to increase the user detection response time because doing so will decrease the use of computational resources and power consumption from power source 40 without sacrificing reliability. In devices employing batteries as power source 40, this action can extend the life of the battery. In another embodiment, controller 48 (or subcontroller 48$_1$ in the illustrated embodiment) may be configured—either as an alternative to increasing the sampling rate or, as shown in FIG. 2, in addition to increasing the sampling rate—to perform the substep 74 of applying a filter to the output signal if the level of noise in the output signal meets a predetermined condition relative to the predetermined threshold noise level (e.g., exceeds the predetermined threshold noise level). The use of additional filtering on the output signal will again increase the use of computational resources and power consumption from power source 40, but will reduce or prevent false readings based on noise in the output signal. Although the illustrated embodiment shows that a filter is applied if the level of noise meets a predetermined condition and the filter is not applied if the noise does not meet the predetermined condition, it should be understood that variations are possible including embodiments in which a greater degree of filtering is applied when the condition is met and a lesser degree of filtering is applied when the condition is not met and embodiments in which the noise level is compared against multiple threshold levels with different degrees of filtering depending on whether the noise level meets predetermined conditions relative to each threshold (e.g., if the detected noise level is greater than a first noise level, apply one level of filtering, if the detected noise level is greater than a second noise level greater than the first noise level, apply a second level of filtering greater than the first level of filtering, etc.). For the benefit of an installer or other user, controller 48 may be configured to generate output signals indicative of various values including the output signal, the noise in the signal, and the impact of the filtering or other noise reducing measures on the signal. In one embodiment, controller 48 displays data to a user through the user interface of the I/O interface including the mean signal level of the output signal, the root mean square noise level determined in step 60 and the impact of applying a filter to the signal in step 74.

The method may include additional steps intended to mitigate or reduce the level of noise in the signal. For example, controller 48 may be configured in step 76 to adjust a sensitivity to sensor 42 responsive to the level of noise or other characteristic of noise in the output signal. If the level of noise in the signal meets a predetermined condition relative to a predetermined threshold level of noise, controller 48 may adjust the sensitivity of sensor 42. For example, if the level of noise in the signal is relatively high, controller 48 may be configured to increase the likelihood that a signal from sensor 42 will be read as detecting the presence of a person or other object. If the level of noise in the signal is relatively low, controller 48 may be configured to decrease the likelihood that a signal from sensor 42 will be read as detecting the presence of a person or other object.

The method may conclude with the step 78 of transmitting, responsive to the output signal, a control signal to solenoid 44. Controller 48 (or subcontroller 48$_2$ in the illustrated embodiment) is configured to generate control signals used to control the operation of solenoid 44 and, as a result, the position of valve 46. In response to the output signal of sensor 42, controller 48 will transmit control signals to solenoid 44. As discussed above, the responsiveness of controller 48 to the output signal may be adjusted based on the level of noise detected in the output signal.

Figure 2C:
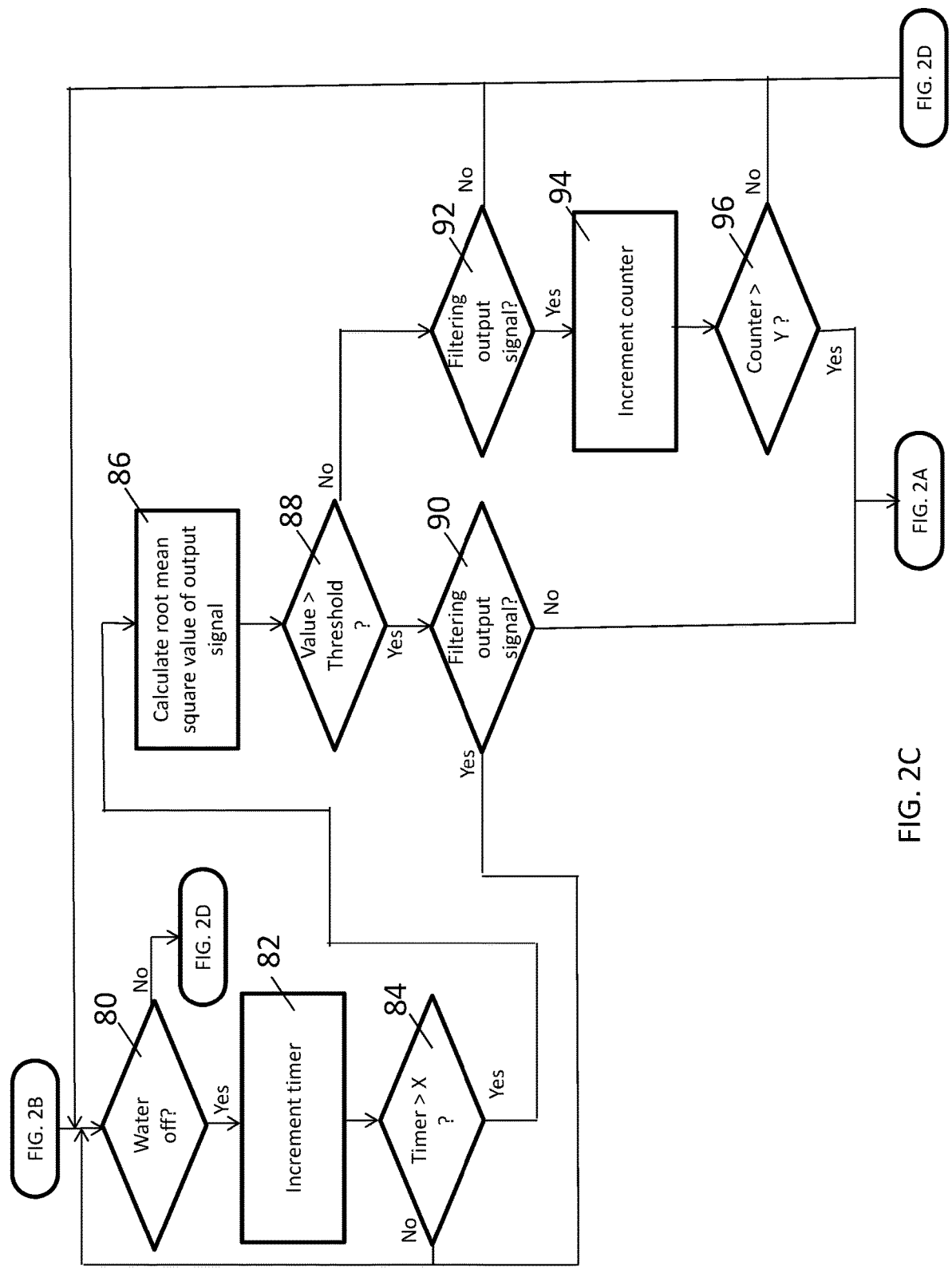

Steps 56 (FIG. 2A) and 66 (FIG. 2B) described above are preferably performed using a relatively high amount of data taken over a relatively short timeframe (e.g., five hundred (500) data points at 200 Hz). Once the baseline noise level has been determined and remedial actions taken, however, it may be desirable to monitor for subsequent changes in the level of noise in the signal using less data in order to reduce power consumption within system 24. Therefore, controller 48 may perform a number of steps to monitor for conditions in which the baseline noise level is unlikely to change (e.g., when a user of the fluid dispensing device is not present and no fluid is dispensed) and to determine whether and when steps 56, 66 should be repeated. Referring now to FIG. 2C, controller 48 may determine in step 80 whether water is being dispensed based on the position of valve 46. If valve 46 is closed, controller 48 increments a timer in step 82 and determines in step 84 whether the time has reached a predetermined level (e.g., corresponding to a set time such as two minutes). Steps 80, 82, 84 are repeated until valve 46 moves to an open position or the timer reaches the predetermined level. Once the timer reaches a predetermined level, controller 48 again determines a characteristic of noise in the output signal from sensor 42. As compared to step 56 described hereinabove, however, controller 48 makes the determination using a relatively low amount of data taken over a longer timeframe (e.g., sixteen (16) data points at 8 Hz). In one embodiment, controller 48 calculates, in step 86, a room mean square value for the output signal and compares the value to a threshold value in step 88. It should be understood, however, that controller 48 could determine other characteristics of noise in the output signal including by performing steps similar to steps 62, 64 (FIG. 2A) and 68 (FIG. 2B) described above. If the value meets a predetermined condition relative to the threshold value (e.g., exceeds the threshold value) indicative of potential noise in the signal, controller 48 may determine in step 90 whether remedial actions, such as application of a filter, are already being applied to the output signal. If a filter is not being applied, controller 48 may return to step 56 (FIG. 2A) to reevaluate potential noise in the signal using more data. If a filter is already being applied, controller 48 may return to step 80. If the value determined in step 86 does not meet the predetermined condition relative to the threshold value (e.g., is less than the threshold value), controller 48 may again determine in a step 92 whether remedial actions, such as application of a filter, are already being applied to the output signal. If no filter is being applied, controller 48 may simply return to step 80. If a filter is already being applied, the fact that the value determined in step 86 is below a threshold level may be indicative of a reduction in noise due to, for example, a switch from an alternating current power source to a battery (e.g., a backup power source). In this circumstance, it may be desirable to disable the filtering or other noise mitigating actions previously applied to the output signal in order to reduce power consumption. In steps 94 and 96, controller 48 may increment a counter and compare the counter to a predetermined value. The predetermined value is selected to delay a change in noise mitigation actions unless and until the reduced noise level has been maintained for a predetermined period of time. Therefore, if the counter does not meet a predetermined condition relative to the predetermined value (e.g., is less than the predetermined value), controller 48 may return to the step 80. If the counter does meet the predetermined condition (e.g., is equal to or greater than the predetermined value), controller 48 may return to step 56 (FIG. 2A) to reevaluate the amount of noise in the output signal using more data.

Figure 2D:
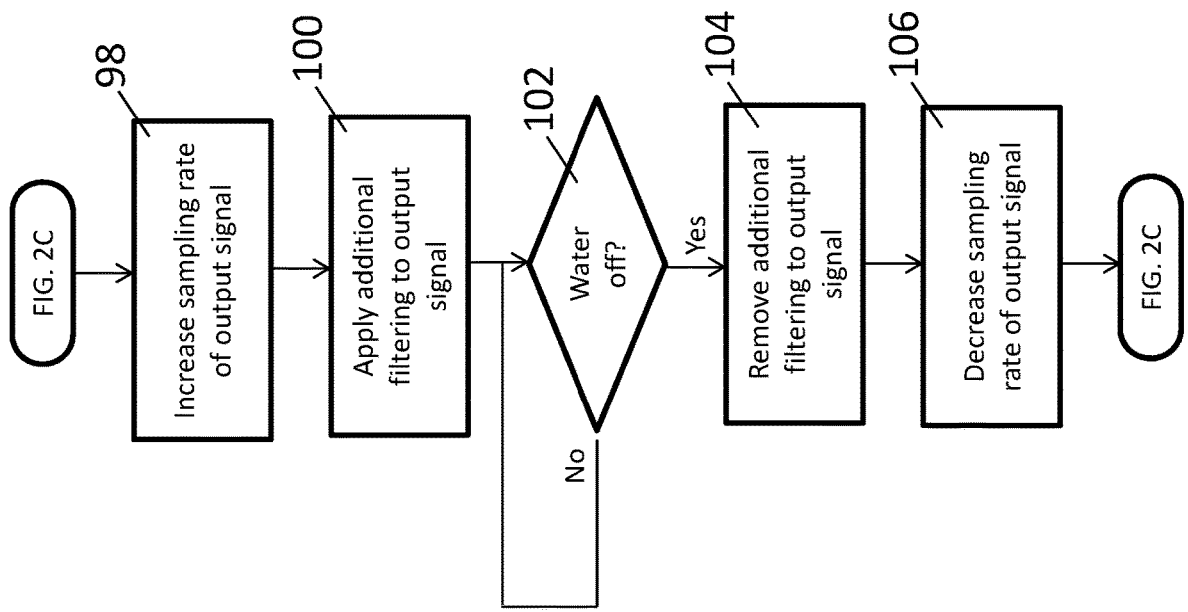

If controller 48 determines in step 80 that valve 46 is open and that water is being dispensed from device 10, controller 48 may perform additional actions to reduce noise in the output signal as illustrated in FIG. 2D. It has been determined that the presence of a user of device 10 and the output of water from device 10 can result in variation in the amount of noise in the output signal of sensor 42 and, in particular, an increase in noise. Therefore, when water is output from device 10, controller 48 may perform the steps 98, 100 of further increasing the sampling rate of the output signal and applying an even greater level of filtering to the output signal. Controller 48 may determine in step 102 whether valve 46 has closed and water is no longer being dispensed from device 10 and may maintain the increased sampling frequency and additional filtering until valve 46 is closed. Once valve 46 is closed, controller 48 may perform the steps 104, 106 of removing the additional filtering and decreasing the sampling rate of output signal. Thereafter, controller 48 may return to step 80 in FIG. 2C.

A fluid dispensing device and a method for controlling a fluid dispensing device in accordance with the present teachings is advantageous relative to conventional devices and control methods. In particular, the device is configured to adjust to varying levels of noise that may be present in the output signal of a sensor 42 in order to improve the reliability of the output signal when noise levels are relatively high while conserving power when noise levels are relatively low (e.g., to extend battery life in devices where power source 40 comprises a battery).

While the invention has been shown and described with reference to one or more particular embodiments thereof, it will be understood by those of skill in the art that various changes and modifications can be made without departing from the spirit and scope of the invention.

We claim:

1. A fluid dispensing device, comprising:
   a housing defining a fluid outlet;
   a valve controlling a flow of fluid to the fluid outlet;
   a sensor configured to detect an object outside of and proximate to the housing;
   a solenoid configured to move the valve between an open position and a closed position; and,
   a controller configured to
     receive the output signal of the sensor;
     perform a process for addressing noise in the output signal including
       determining a characteristic of noise in the output signal; and,
       adjusting at least one of a sampling rate of the output signal or an amount of filtering of the output signal responsive to the characteristic of noise in the output signal; and,
     transmit a control signal to the solenoid responsive to the output signal,
   wherein the controller is further configured, in determining the characteristic of noise in the output signal, to calculate a root mean square value of the output signal, and to apply a high pass filter to the output signal prior to calculating the root mean square value of the output signal.

2. The fluid dispensing device of claim 1 wherein the controller is further configured to:
   calculate the root mean square value of the output signal when the valve has been in the closed position for more than a predetermined period of time;
   compare the root mean square value of the output signal to a threshold value; and,
   repeat the process for addressing noise in the output signal when the root mean square value of the output signal meets a predetermined condition relative to the threshold value and an amount of filtering being applied to the output signal meets a predetermined condition.

3. The fluid dispensing device of claim 1, wherein said process for addressing noise in the output signal further includes
   comparing the characteristic of noise to one or more threshold values; and,
   adjusting at least one of a sampling rate of the output signal or an amount of filtering of the output signal responsive to the characteristic of noise in the output signal, wherein at least one of the sampling rate or the amount of filtering is increased if the characteristic of noise exceeds the one or more threshold values, but otherwise at least one of the sampling rate or the amount of filtering is decreased.

4. The fluid dispensing device of claim 3 wherein the controller is further configured to further increase the sampling rate of the output signal and the amount of filtering of the output signal when the valve is in the open position.

5. The fluid dispensing device of claim 1 wherein the controller is further configured to adjust a sensitivity of the sensor responsive to the characteristic of noise in the output signal.

6. The fluid dispensing device of claim 1 wherein the sensor comprises a capacitance sensor and the housing forms part of a capacitive circuit.

7. The method of claim 1 wherein the adjusting step includes the substeps of:
   comparing a level of noise in the output signal to a predetermined threshold noise level; and
   increasing or decreasing the sampling rate of the output signal if the level of noise in the output signal meets a predetermined condition relative to the predetermined threshold noise level, or
   applying a filter to the output signal if the level of noise in the output signal meets a predetermined condition relative to the predetermined threshold noise level.

8. A fluid dispensing device, comprising:
   a housing defining a fluid outlet;
   a valve controlling a flow of fluid to the fluid outlet;
   a sensor configured to detect an object outside of and proximate to the housing;
   a solenoid configured to move the valve between an open position and a closed position; and,
   a controller configured to
     receive the output signal of the sensor;
     perform a process for addressing noise in the output signal including
       determining a characteristic of noise in the output signal; and,
       adjusting at least one of a sampling rate of the output signal or an amount of filtering of the output signal responsive to the characteristic of noise in the output signal; and, transmit a control signal to the solenoid responsive to the output signal
wherein the controller is further configured, in determining the characteristic of noise in the output signal, to:
apply a transform to the output signal to obtain a frequency domain signal; and,
perform a numerical analysis of the frequency domain signal.

9. The fluid dispensing device of claim 8 wherein the numerical analysis comprises a power spectral density of the frequency domain signal.

10. The fluid dispensing device of claim 8 wherein the controller is further configured, in determining the characteristic of noise in the output signal, to apply a high pass filter to the output signal prior to applying the transform to the output signal.

11. The fluid dispensing device of claim 8 wherein said process for addressing noise in the output signal further includes
comparing the characteristic of noise to one or more threshold values; and,
adjusting at least one of a sampling rate of the output signal or an amount of filtering of the output signal responsive to the characteristic of noise in the output signal, wherein at least one of the sampling rate or the amount of filtering is increased if the characteristic of noise exceeds the one or more threshold values, but otherwise at least one of the sampling rate or the amount of filtering is decreased.

12. The fluid dispensing device of claim 11 wherein the controller is further configured to further increase the sampling rate of the output signal and the amount of filtering of the output signal when the valve is in the open position.

13. The fluid dispensing device of claim 8 wherein the controller is further configured to adjust a sensitivity of the sensor responsive to the characteristic of noise in the output signal.

14. The fluid dispensing device of claim 8 wherein the sensor comprises a capacitance sensor and the housing forms part of a capacitive circuit.

15. The method of claim 8 wherein the adjusting step includes the substeps of:
comparing a level of noise in the output signal to a predetermined threshold noise level; and
increasing or decreasing the sampling rate of the output signal if the level of noise in the output signal meets a predetermined condition relative to the predetermined threshold noise level, or
applying a filter to the output signal if the level of noise in the output signal meets a predetermined condition relative to the predetermined threshold noise level.

16. A fluid dispensing device, comprising:
a housing defining a fluid outlet;
a valve controlling a flow of fluid to the fluid outlet;
a sensor configured to detect an object outside of and proximate to the housing;
a solenoid configured to move the valve between an open position and a closed position; and,
a controller configured to
receive the output signal of the sensor;
perform a process for addressing noise in the output signal including
determining a characteristic of noise in the output signal; and,
adjusting at least one of a sampling rate of the output signal or an amount of filtering of the output signal responsive to the characteristic of noise in the output signal; and,
transmit a control signal to the solenoid responsive to the output signal
wherein the controller is further configured to increase the at least one of the sampling rate of the output signal or the amount of filtering of the output signal responsive to a user command received through an input/output interface of the controller.

17. The fluid dispensing device of claim 16 wherein the controller is further configured to adjust a sensitivity of the sensor responsive to the characteristic of noise in the output signal.

18. The fluid dispensing device of claim 16 wherein the sensor comprises a capacitance sensor and the housing forms part of a capacitive circuit.

19. A method for controlling a fluid dispensing device, comprising the steps of:
receiving an output signal of a sensor configured to detect an object outside of and proximate to a housing of the fluid dispensing device;
determining a characteristic of noise in the output signal;
adjusting at least one of a sampling rate of the output signal or an amount of filtering of the output signal responsive to the characteristic of noise in the output signal; and
transmitting, responsive to the output signal, a control signal to a solenoid configured to move a valve between an open position and a closed position to control the flow of fluid to a fluid outlet defined in the housing,
wherein the determining step includes the sub step of calculating a root mean square value of the output signal,
wherein the determining step further includes the sub step of applying a high pass filter to the output signal prior to calculating the root mean square value of the output signal.

20. A method for controlling a fluid dispensing device, comprising the steps of:
receiving an output signal of a sensor configured to detect an object outside of and proximate to a housing of the fluid dispensing device;
determining a characteristic of noise in the output signal;
adjusting at least one of a sampling rate of the output signal or an amount of filtering of the output signal responsive to the characteristic of noise in the output signal; and
transmitting, responsive to the output signal, a control signal to a solenoid configured to move a valve between an open position and a closed position to control the flow of fluid to a fluid outlet defined in the housing,
wherein the determining step includes the substeps:
applying a transform of the output signal to obtain a frequency domain signal; and,
calculating a power spectral density of the frequency domain signal.

21. The method of claim 20 wherein the determining step further includes the substep of applying a high pass filter to the output signal prior to applying the transform to the output signal.

22. A method for controlling a fluid dispensing device, comprising the steps of:

receiving an output signal of a sensor configured to detect an object outside of and proximate to a housing of the fluid dispensing device;

determining a characteristic of noise in the output signal;

adjusting at least one of a sampling rate of the output signal or an amount of filtering of the output signal responsive to the characteristic of noise in the output signal;

transmitting, responsive to the output signal, a control signal to a solenoid configured to move a valve between an open position and a closed position to control the flow of fluid to a fluid outlet defined in the housing; and increasing the at least one of the sampling rate of the output signal and the amount of filtering of the output signal responsive to a user command.

23. A method of operating a sensing system, which includes a load that receives power from a power source, a controller in communication with the load, and a sensor in communication with the controller, and wherein the method includes the following steps:

a) receiving an output signal from the sensor;

b) applying a high pass filter to the output signal;

c) further processing the output signal to determine a value associated with the signal, including at least one of i) calculating a root mean square (RMS) of the sampled signal or ii) applying a transform to the output signal to obtain a frequency domain signal and performing a numerical analysis of the frequency domain signal;

d) determining whether the value is above a threshold; and e) identifying a type of the power source of the sensing system, including e1) determining that the power source is an alternating current power source, when the value is determined to be above the threshold, otherwise, e2) determining that the power source is a direct current power source.

24. The method of claim 23, further including:

f) adjusting processing of the output signal, including:

f1) when the power source is determined to be the alternating current power source, increasing sampling rate of the output signal to decrease user detection response time and/or increasing filtering of the output signal to improve sensing reliability, and f2) when the power source is determined to be the direct current power source, reducing sampling rate to conserve battery life and/or decreasing filtering of the output signal to conserve battery life.

25. The method of claim 23, further including:

addressing noise in the output signal, including comparing a characteristic of noise to one or more threshold values; and, adjusting at least one of a sampling rate of the output signal or an amount of filtering of the output signal responsive to the characteristic of noise in the output signal, wherein at least one of the sampling rate or the amount of filtering is increased if the characteristic of noise exceeds the one or more threshold values, but otherwise at least one of the sampling rate or the amount of filtering is decreased.

\* \* \* \* \*